TEST CONNECTION CONTROL UNIT

Filed Nov. 29, 1966 2 Sheets-Sheet 1

United States Patent Office 3,497,640
Patented Feb. 24, 1970

3,497,640
TEST CONNECTION CONTROL UNIT
Jacques P. Basset, Paris, and Gerard C. Taliere, Champigny-sur-Marne, France, assignors to International Standard Electric Corporation, New York, N.Y., a corporation of Delaware
Filed Nov. 29, 1966, Ser. No. 597,753
Claims priority, application France, Dec. 13, 1965, 41,979
Int. Cl. H04m 3/22
U.S. Cl. 179—175.2 4 Claims

ABSTRACT OF THE DISCLOSURE

The present invention relates to improvements in the selection systems for automatic telephone exchanges. More specifically, it provides simple arrangements making it possible to use, for test calls, units of equipment which are individually designated in advance. A monitor circuit for establishing test calls is arranged to associate a first set of units and a second set of units with a control device. This monitor detects the units, designated in advance, where the call begins and ends. Also, it locks out all of the other units except the designated ones. Thus, it is apparent that only the designated units may reply to the call. As soon as possible, the monitor removes the locking so that the units are immediately restored to serve the normal traffic. This way maintenance personnel may select any unit for conducting a test thereon.

Figure 1:
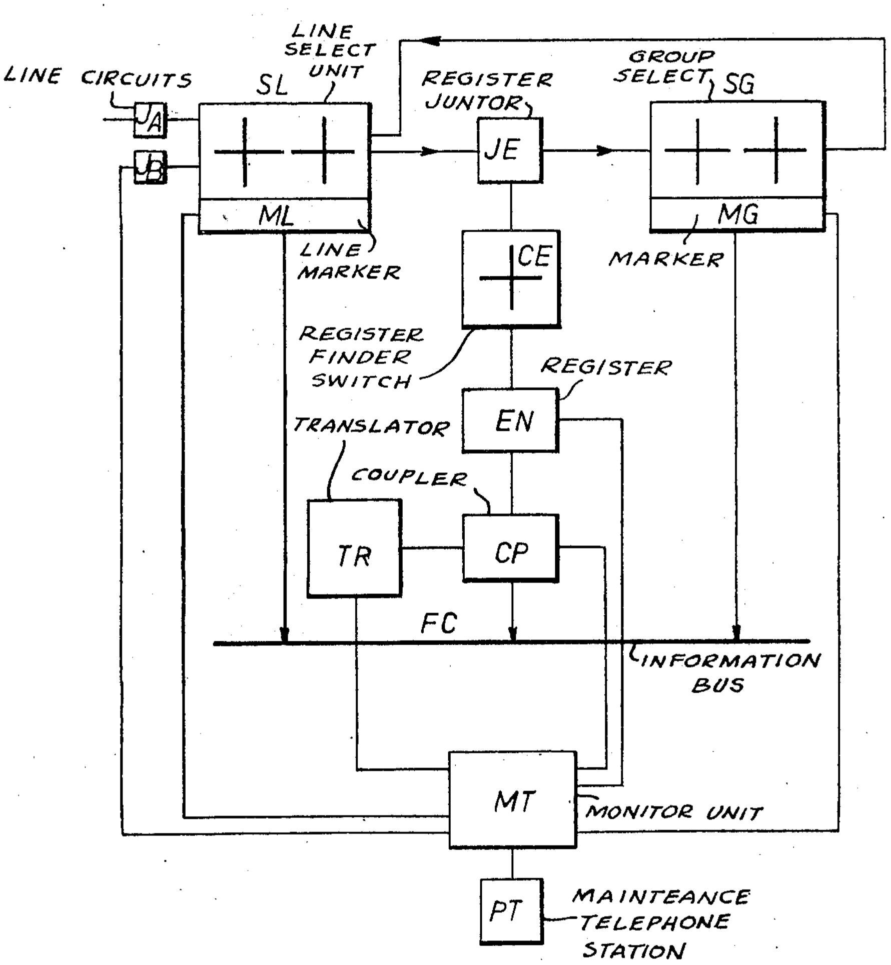

The present invention relates to improvements in selection systems for circuits or electric equipment, and more particularly to arrangements making it possible to establish test calls by means of units which are designated in advance. It finds its application mainly, though not exclusively, in switching systems such as telephone and telegraph exchanges.

For example, a telephone exchange includes incoming and outgoing circuits, a network having several switching stages, testing and control units, registers, couplers, translators, markers, and the like. The establishment of a telephone call requires these and other units to operate together.

When a subscriber lifts his handset, the call is received by his equipment which responds and a first selection stage operates to connect the line to a free one of many registers. The connected register immediately transmits a dialling tone. The calling subscriber then sends the digits of the called subscriber's number to the register. When this transmission of the digits is terminated, the register connects itself to a coupler by means of which it seizes a translator and a marker. Then, the register sends the digits to the translator, and the translator sends corresponding equipment location codded information to the marker. According to this information, the marker directs the switching network to make a selection and the calling line is connected to the called line or to an outgoing trunk extending in the required direction. Generally a marker does not control the entire switching network, and several partial selections must be made one after the other. When the selections are completed, the calling line is connected to the called line. Then the various checking, control, and other units are released.

During this complex process, a failure might occur in any circuit. This failure suspends the normal running of the operations and gives an alarm signal, after which all of the units involved in the call are released. In the larger and more complex installations, the signal is very complete, as, for instance, a punched card is made indicating the units which had been seized for the call concerned, at the instant when the failure occurred. After the punched card is made, it is advisable to attempt to reproduce the failure by making a test call before undertaking any maintenance on the apparatus. Moreover, when an exchange is enlarged, the newly installed apparatus must be tried out first before being cutover into actual traffic conditions. Therefore, it is also advisable to be able to place test calls to this new equipment. Finally, in smaller exchanges, it may not always be possible to identify all units where failures occur by elaborate punched cards, and it may be necessary to probe for faults by placing repeated calls.

For these and other purposes, means must be provided which would make it possible to designate expressly the units which are to be seized and used during a test call and to modify the selection processes so that only the designated units may be utilized. These means must be so simple that they themselves cannot become a source of failures. They should be designed so that this feature may be added to existing installations without requiring any extensive modification. Moreover, it should be possible to add the feature and put it into operation when the exchange is in normal operation.

Accordingly, an object of the invention is to provide a circuit, effective at the beginning of a call, for selecting a unit from a first set (for instance, a register) which will be used to complete the call. A further object is to lock out all of the units except the selected one.

Another object of the invention is to remove the lock out at the end of the call.

According to one aspect of the invention, a switching selection system comprises a first set of units, a second set of units, and various control devices for making test calls (herein called "monitor"). The monitor includes means for detecting, in any unit designated in advance from the first set, the begining and the end of the call. The monitor also makes it possible, when starting a call, to lock out all of the units of the second set except one, so that only this one may respond to the call, and it is seized by the calling unit from the first set. When the call ends, the lock out is removed so that the units of the second set are immediately restored to serve the usual traffic.

According to an alternative feature of the invention, a selection contact is assigned to a unit from the second set (say a register for seizure by a subscriber's line, for instance). In a first position, this contact connects the locking conductor to the locking circuit of the monitor, and makes it possible to occupy the selected unit during the interval while a test call is being established. In a second position, the contact connects the locking conductor of the unit to a circuit for checking the busy condition circuit. This makes it possible, during a test call, not only to designate a unit for responding to the test call, but also to detect the instant when the unit becomes busy through the test call. Consequently, the circuits may immediately cease the locking-out of the other units of the second set. This arrangement avoids having to detect the end of the test call in the calling unit of the first set.

Figure 2:
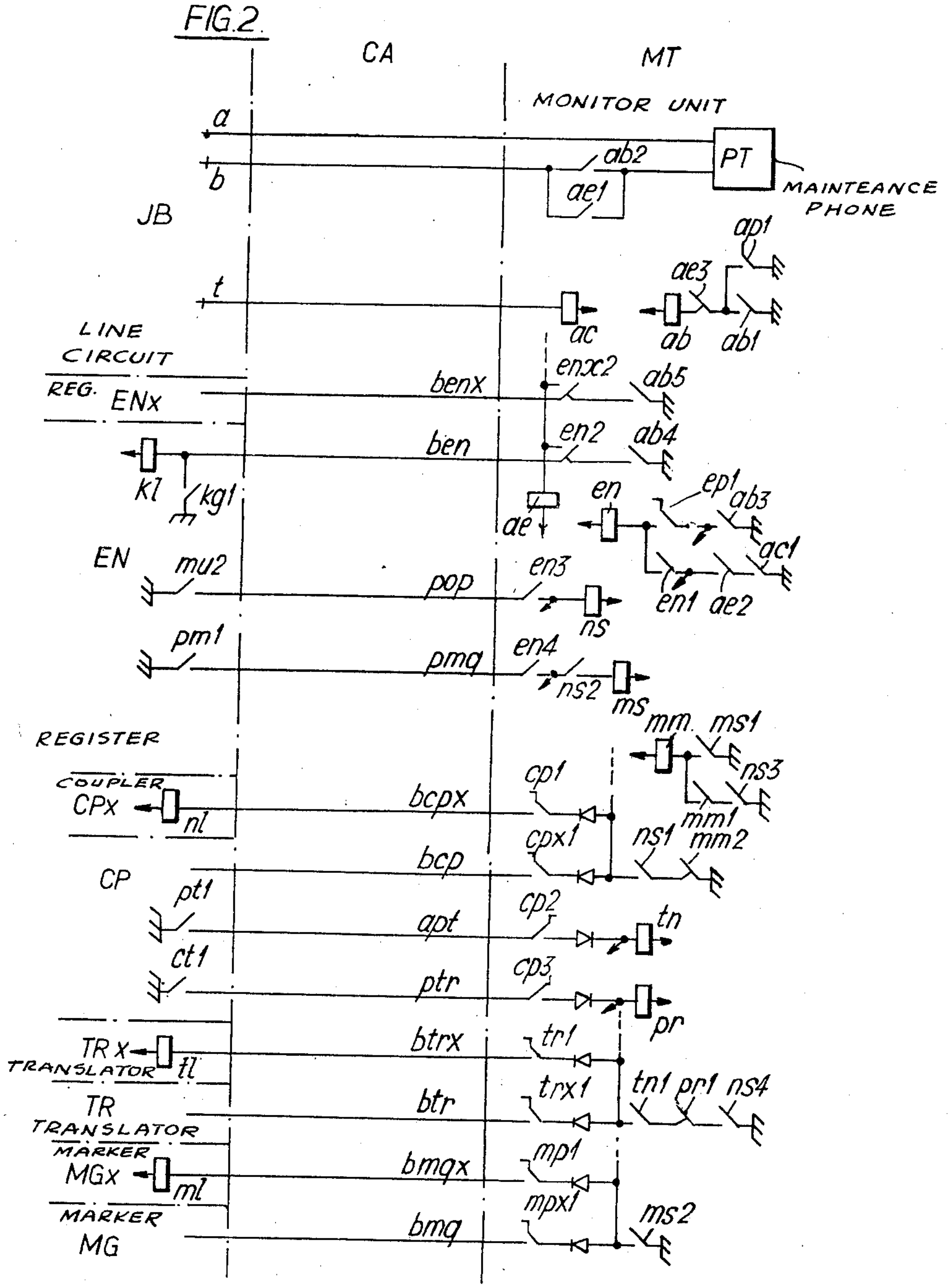

The above mentioned and other features of this invention and the manner of obtaining them will become more apparent, and the invention itself will be best understood by reference to the following description of an embodiment of the invention taken in conjunction with the accompanying drawings, in which:

FIGURE 1 is a block diagram of a telephone installation wherein test connections are established through those means which are the subject matter of the present invention; and FIGURE 2 is a detailed schematic circuit of an embodiment of the present invention.

As an example, and in order to show clearly the various operations necessary for establishing a test call, the diagram of FIGURE 1 represents certain elements of a telephone installation which make it possible to estabish local calls only. Nevertheless, it should be understood that the invention can also apply to other types of telephone installations in almost any kind of automatic switching installation.

Each of the subscribers' lines, such as 1*a*, is terminated by an individual line unit, such as JA, JB. Every line unit is connected to an access point on a line selection unit SL comprising a connection network of two or more stages of crossbar switches controlled by one or more line markers, such as ML. The outlets of these line selection units SL are connected to register junctors such as JE.

The junctor JE is connected to an inlet of a group selection unit SG comprising a connection network and one or more markers, such as MG. This group selection unit makes it possible to connect the junctor JE to an inlet of a line selection unit, such as SL, to which the called subscriber is linked. The line selection unit SL makes it possible to connect the junctor JE to the called subscriber's line. When this operation is performed, and if the called subscriber is free, the calling line is connected to the called line, and the call is established.

When the calling subscriber station goes off-hook, the calling line is immediately connected to the junctor JE, and then to a register such as EN, through a register finder switch CE. The register EN transmits a dial tone signal to the caller; then, it receives and registers the digits of the called subscriber's number. By means of these digits, it controls the execution of the network selections.

For the group selection, the register EN seizes and connects itself to a coupler, such as CP. In turn, coupler CP seizes a translator, such as TR, to which the register EN communicates the digits that it has received from the calling line. The translator TR provides the coded equipment location indications required for directing the group selection process. At the same time, the register EN connects itself with the group selection unit SG to which the junctor JE is connected. This causes the seizure of a marker, such as MG. The coupler CP and the marker MG connect themselves to the multichannel information bus FC. This multichannel information bus FC includes a group of conductors making it possible to rapidly exchange information between couplers and markers. Through this channel are transmitted the coded indications established by the translator TR. The marker MG receives them, operates the selection unit SG, and connects the junctor JE to one inlet of the line selection unit SL to which the called subscriber is connected.

When the group selection process is terminated, the coupler CP, the translator TR, and the group marker MG are released.

Immediately after the register receives the complete number of the called subscriber, the line selection process is started. It is performed in the same fashion as the group selection; however, generally no translator is requested because the received digits may be transmitted directly to a line marker, such as ML, and there utilized for conducting the selection.

At each stage of the operating process described above, it is necessary to seize one unit from among several units. For example, when a subscriber lifts his handset, one of the available registers is chosen. For this purpose, a register junctor JE may be seized only if the register finder CE which serves it is free and has at its disposal at least one free register EN. It is thus possible to connect the calling line to one of the available register junctors and be certain of being able to connect this latter to a free register.

The registers are assembled into groups of seven, for instance, and each group uses the services of two couplers. Each pair of couplers can connect onto two translators. A selection unit generally comprises two markers. Consequently, for every calling line selection of a register, that register must choose out one of the two couplers of its group, and the latter chooses one of the two translators that it employs. Moreover, one of the two markers is chosen in the selection unit. In order to simplify the present disclosure, it is assumed that there is only one group selection unit; the routing onto a particular line selection unit is determined by the called subscriber's number. In the normal operation, all of these path selections are performed in relation to the availability of units prevailing at the moment of selection.

The present invention concerns simple means for controlling the selection of units so that a test call may seize only the units designated in advance, if they are then idle. These means are all assembled in a monitor unit MT connected to all of the registers, couplers, translators, markers and to a subscriber's junctor JB. Indeed, a telephone station PT is associated with monitor MT and linked through the monitor to the subscriber's line unit JB. This telephone station PT is used by the maintenance personnel who are placing the test calls.

The monitor MT is closely associated with the maintenance desk in the exchange. This desk comprises the individual signalling lamps of all the units in the exchange. It therefore enables the monitor operator to know about the busy and idle conditions and to send a test call only when the unit to be tested is free. The monitor MT designates, in advance, the units through which and by which the call will progress. It then locks out all the units except one; this one being forcibly chosen and seized by the calling unit.

Thus, the monitor MT detects the lifting of a handset of station PT and it causes the locking-out of all the registers except one, for instance the register EN. The call presented by the subscriber's junctor JB is thus routed into the register EN which appears to be the only one available in the exchange. The monitor also detects the putting through of the call and immediately removes the locking-out of other registers, so as to disturb to a minimum the running of the exchange. Then, when the register EN must seize a coupler CP, the monitor MT detects the call in the register EN and causes the locking-out of one of the two couplers in order that the other one will be chosen and seized by the register. The same applies to the seizure of a translator, of a group marker, or of a line marker.

In a practical embodiment, means may be taken to avoid locking-out all of the registers of the exchange while a test call is being placed. Indeed, a subscriber's station does not generally have access to all of the registers of the exchange if this happens to be an exchange of any appreciable size. In this case, it is merely necessary to lock-out only the non-chosen and accessible registers. The same reasoning can apply to all the stages of the call-establishing.

When a register calls a coupler during a test call, the other coupler is locked until the register has been satisfied. A hindrance is thus brought to the functioning of the exchange, but it is limited in space and time since it only takes place for the other registers using the same couplers, and it only lasts the time required to serve the register which is seized for testing purposes. The same applies to the seizure of a translator or of a marker. Therefore, as a practical matter, the putting through of test calls by means of a monitor MT does not bring any significant disturbations to the performance of the exchange. On the other hand, if all of the registers of the exchange are locked-out except one, so that the station of the monitor MT might be connected to the selected register, the hindrance brought to the functioning of the exchange is more extended, but is of shorter duration, because the unlocking occurs as soon as the designated register is seized, whether it is seized by the test call or by another call. The locking therefore is limited to the duration of a preselection. If the designated register is seized by some call other than the test call, the test call is cancelled, and the operator will have to renew it when the register to be tested gets free.

Next to be described, in referring to FIGURE 2, is an embodiment of the monitor MT in FIGURE 1 which enables the putting through of test calls by units designated in advance. The monitor MT with its telephone station PT is linked by a bundle of conductors CA to the units of the exchange, namely: the subscriber line unit JB, registers EN and EN*x*, couplers CP and CP*x*, translators TR and TR*x*, and markers MG and MG*x*. The monitor is made up of relay circuits, a relay being illustrated by a rectangle bearing the connections of one or two windings. It is referenced by two small letters. According to the detached-contact representation, the contacts controlled by a relay are positioned anywhere in the diagram. They bear the same reference letters of the relay followed by a number. Moreover, it is worth noting that the various circuits are current-supplied by a same direct current source, for instance a battery, the positive terminal of which is earthed. The circuits leading to the negative terminal of this battery are indicated by an arrowhead.

First, it will be assumed that it is required to make a test call by utilizing the register EN. For this purpose, the operator must depress a key controlling the contact *ep*1, so as to prepare the energizing circuit of the relay *en* associated with register EN. In the monitor MT, there is one relay, such as *en*, for each register in the exchange.

Next, the operator depresses a non-locking key controlling the contact *ab*1. The relay *ab* operates and holds itself through its contact *ab*1. The operator may now release the key *ab*1. The contact *ab*2 closes, and the station PT is connected in a loop onto the line wires *a* and *b* of the station unit JB. The telephone station PT hookswitch completes an electric continuity between the line wires *a, b,* so that closure of the contact *ab*2 is equal to the lifting of a handset by a calling subscriber. The call is detected and signalled in the subscribers line unit JB.

On the other hand, the relay *en* which corresponds to the register EN, operates through the contact *ab*3 and the contact *ep*1.

The monitor is connected to every register of the installation by means of three conductors: *ben, pop* and *pmq*. The wire *ben* is connected, in the register, to the busy-marking circuit comprising the relay *kl* and the contact *kg*1. When the register is busy, the contact *kg*1 is closed and the relay *kl* is energized. Therefore, to seize the register, it is merely necessary to earth the wire *ben*. To know whether it is busy, it is merely necessary to find out if the wire *ben* is earthed. By way of example, the wire *benx* of the register EN*x*, not shown in detail (contact *enx*2 in rest condition), is earthed by the contact *ab*5. The same applies for all the other registers. Whereas, since relay *en*, corresponding to the register EN, is in an operated condition, the wire *ben* of this register is not earthed, but is connected to battery via the relay *ae*. There is only one relay *ae*, and it is connected via contacts such as *en*2 to all of the wires *ben, benx,* etc.

Thus, with the exception of the register EN, all the registers of the exchange are marked busy by the earth potentials delivered by contacts such as *ab*5. No earth potential is delivered for the selected register because the contact *en*2 for that register, is in operated condition. There exists only one free register, and the call carried by one subscriber line unit JB is forcibly directed onto this register.

In a practical embodiment, as has already been mentioned above, the line unit JB generally does not have access to all of the registers of the exchange. In this case, the monitor MT will have only a relay, such as *en*, for each accessible register. The locking-out will concern only these accessible registers. Special arrangements can be used for extending then the utilization possibilities of the monitor, such as: the providing of two or several possible lines for the test calls, several groups of register selection relays such as *en*, and additional switching means making it possible to select the group of registers to be locked-out.

When the calling line is connected to the register EN, an earth potential is received in the line unit JB along wire *t*. The relay *ac* of the monitor operates. At the same time, the seized register EN is marked as busy. Its contact *kg*1 closes and earth potential is applied the corresponding wire *ben*. Since this wire extends to the monitor relay *ae*, the relay *ae* operates.

The relay *en* receives a holding circuit by means of contacts *en*1, *ae*2 and *ac*1. The line circuit JB is held by the contact *ae*1. The opening of contact *ae*3 breaks the holding circuit of relay *ab* which releases. The contacts, such as *ab*5, open to remove the lock-out from the registers.

Therefore, in keeping with an aspect of the present invention, the device does make it possible to obtain a test call by a register designated in advance, in a simple fashion, and by disturbing in the least possible amount the operation of the exchange since the locking is removed as soon as the test call is put through.

If another and regular traffic call is received by the exchange at the same time when the maintenance personnel is placing a test call via the monitor MT, that other call seizes the register EN. The relay *ae* operates, as has been described above. The relay *ac* remains in rest condition, since the line circuit unit JB is not connected to the register, and the contact *ac*1 remains open. The relay *ab* releases, as before, and the locking of the registers ceases. At opening of contact *ab*3, the relay *en* releases also. Its holding circuit is not established, since contact *ac*1 remains open. Therefore, the relay *ae* releases when the contact *en*2 restores to rest condition. At opening of contact *ae*1, after the opening of contacts *ab*2, the station PT is disconnected from the line circuit JB. The call ceases. The operator, ascertaining that the register is busy and that he gets no answer will have to renew his call later.

Now it will be assumed that in addition to register EN, the test call must select a specific coupler CP. For making this selection before the call, the operator depresses a key closing the contacts *cp*1, *cp*2 and *cp*3. Then, the operator depresses his call-button, and he gets a connection to the register EN, as described above. Then, he sends the digits representing the directory number of a called subscriber's station. When the register EN has received sufficient digits to effect the group selection, a coupler must be seized. In the register EN, a contact *mu*2 closes, at the same time when the call is being brought from the register into the two couplers, for instance CP and CP*x*, which serve that group of registers of which register EN forms a part. In the monitor MT, the earth potential received along wire *pop* causes the energizing relay *ns* through contact *en*3.

In order that the coupler used by the register EN should be the coupler CP, the monitor MT locks the other one or the other several couplers which the register EN could utilize, for instance coupler CP*x*. For this purpose, an earth potential is applied on wire *bcpx* by means of contacts *mm*2, *ns*1, a decoupling diode, and the contact *cp*1. This earth potential energizes the busy condition relay *nl*, and thus makes the couplers CP*x* busy and unavailable. The same procedure is used for the locking of each of the couplers. Thus the wire *bcp* of coupler CP can be earth by the contact *cpx*1.

The register therefore seizes the coupler CP and connects into it. When this operation is accomplished, a group marker must be seized. In the register EN, the corresponding control is signalled by the closing of a contact such as *pm*1 marking the wire *pmq* with an earth potential. In the monitor MT, the relay *ms* energizes, by means of a contact *en*4 and the contact *ns*2. The relay *mm* is energized by the contact *ms*1, and it holds through the contacts *mm*1 and *ns*3. The opening of contact *mm*2 removes the locking earth potential from the one or from the several couplers. The locking of the couplers is, therefore, limited to the duration necessary for the register EN to be connected to the required coupler.

As concerns the designation of a marker of a group marker, the process used is exactly the same as for the couplers. It has just been seen above that when the register signals the call of the markers, the relay *ms* of the monitor MT energizes. The marker MG*x* is marked busy by an operation of the relay *nl* via a circuit including the contact *ms*2 through a decoupling diode, a contact of a selection key such as *mp*1, and a wire such as *bmqx*. The marker MG*x* being unavailable, the marker MG will forcibly be used for the test call if the group selection unit only comprises these two markers. Likewise, it is possible to lock the marker MG through the contact *mpx* and the the wire *bmq*.

This same process is used for the seizure of a translator from a coupler, for instance from coupler CP. In the coupler CP, the call of a translator gives place to the closing of the contact *pt*1 and to the earthing of wire *apt*. In the monitor MT, the relay *tn* operates through a contact *cp*2 and a decoupling diode. The relay *ns* operates because the register EN is still operated and applying an earth potential via the contacts *ns*4, *pr*1 and *tn*1, a decoupling diode, the contact *tr*1 of a selection key, and the wire *btrx*. Thus, relay *tn* locks the translator TR*x* and forces the use of the translator TR during the test call. Likewise, it is possible to lock the translator TR by means of contact *trx*1 and wire *btr*.

When the designated translator is seized, a contact such as *ct*1 closes and the wire *ptr* of the coupler CP is earthed. In the monitor MT, the relay *pr* energizes. Opening of contact *pr*1 causes to cease immediately the locking of the translator.

The above described arrangements enable a switching system to use the units designated in advance for a test call. Although FIGURE 2 limits itself to the arrangements relating to the seizure of the couplers, translators and group markers, it is evident that similar arrangements could be used for directing the seizure of line markers and of any other units in the exchange.

It is worth noting that all the above described circuits are linked into certain points of the exchange units, but they do not require any adding of equipment in these units. All the active elements are in the monitor MT, and it is connected to the installation by means of the conductors CA. Therefore, it is possible to easily add a monitor into an installation in operation. Special steps could be taken, still inside the monitor, to take account of some particular conditions of operation of the units in some installations (different potentials, necessity to check whether a unit is free before locking it, etc.).

While the principles of the invention have been described above in connection with specific apparatus and applications, it is to be understood that this description is made only by way of example and not as a limitation on the scope of the invention.

We claim:

1. A switching system comprising a selecting means and a plurality of units for controlling said selecting means, there being a plurality of like units available to each call on a basis of whether the unit is busy or idle, means for selecting the specific units to be used to complete a test call, and means for thereafter forcing said test call through the selected units, said unit selecting means comprising means for artificially busy marking all units like the selected unit, thereby leaving the selected unit in an idle condition.

2. The system of claim 1 and means for immediately removing the busy marking as soon as said selected unit has been seized by said test call.

3. The system of claim 1 wherein said switching system and said units are associated with each other in a manner such that only a restricted number of said units are available to said test call, said unit selecting means comprising means for artificially busy marking all units available to the test call and like the selected unit.

4. The system of claim 1 and means for coupling said unit selecting means into said system without substantially interfering with the normal operation of said system.

References Cited

UNITED STATES PATENTS

| | | | |
|---|---|---|---|
| 2,383,794 | 8/1945 | Hayes | 179—175.21 |
| 2,562,362 | 7/1951 | Lomax | 179—175.2 |

KATHLEEN H. CLAFFY, Primary Examiner

ALBERT B. KIMBALL, Jr., Assistant Examiner

U.S. Cl. X.R.

179—18